2,951,833

PROCESS FOR THE PREPARATION OF A SUBSTANTIALLY METAL-FREE SOLID ALPHA-OLEFIN POLYMER

Harry S. Young, Swarthmore, Pa., assignor to Sun Oil Company, Philadelphia, Pa., a corporation of New Jersey No Drawing. Filed Apr. 9, 1957, Ser. No. 651,591

4 Claims. (Cl. 260—93.7)

This invention relates to a new process for the preparation of relatively high molecular weight polymers, and more particularly relates to a process for the preparation of solid polymers of alpha-olefins.

Alpha-olefins such as propylene have heretofore been polymerized to high molecular weight solid polymers. A catalyst which is especially effective for the polymerization of alpha-olefins to such relatively high molecular weight solid polymers is the combination of a lower halide of titanium, such as titanium trichloride, and an aluminum trialkyl, such as aluminum triethyl. This catalyst can be prepared by admixing, for example, titanium tetrachloride and aluminum triethyl in an inert solvent such as isooctane. On admixing the two components, a finely divided solid phase is formed as a dispersion in the inert solvent. This dispersion acts as a catalyst for polymerizing alpha-olefins to solid polymers. If desired, a lower halide such as titanium trichloride can be preformed, dispersed in an inert liquid, and an activator such as an aluminum trialkyl added. This solid phase acts as a catalyst for polymerizing alpha-olefins to solid polymers. In performing the polymerization step, an alpha-olefin is contacted with the solid catalyst, such as by passing the olefin through a suspension of the finely divided solid in the inert liquid reaction medium, and is thereby polymerized to solid polymers. Other materials can be substituted for the titanium trichloride and/or aluminum triethyl, as hereinafter described. Anhydrous and oxygen-free conditions are used throughout the process, since the catalyst is deactivated by contact with water or oxygen.

After the polymerization reaction is complete or has proceeded to a desired extent, a catalyst deactivating material such as water or an alcohol is added to the reaction mixture and the mixture is agitated preferably by means which comminute the polymer so that catalyst particles embedded in the polymer are exposed to the deactivant. Thereafter, in order to remove the inorganic catalyst or the inorganic particles from catalyst deactivation, the reaction mixture is contacted with a strong inorganic acid such as an aqueous or alcoholic solution of nitric acid. This contacting is performed at an elevated temperature using vigorous agitation means which may also comminute the polymer so that catalyst particles embedded therein are exposed to the action of the solution. In order to remove even a substantial part of the inorganic particles, the contacting at an elevated temperature is continued for an extended period of time, usually at least several hours. The solid polymer is then separated from the acid solution and is washed and dried. The described means for removing catalyst particles is unsatisfactory in that contacting must be continued for a long time, the inorganic acid especially at the elevated temperatures used is corrosive, an appreciable amount of inorganic material normally remains in the polymer, and the appearance of the final polymer product is adversely affected by contact with the strong acid.

An object of the present invention is to provide a process for the preparation of relatively high molecular weight solid polymers of alpha-olefins. Another object is to provide a process for the preparation of solid polymers of alpha-olefins which is substantially free from inorganic particles. A specific object is to provide a process for polymerizing normally gaseous olefins in which catalyst particles are rapidly and economically removed from the polymer product without the necessity of using corrosive acids. Other objects and their achievement in accordance with the present invention will be apparent hereinafter.

It has now been found that by contacting a polymerization reaction mixture consisting essentially of solid polymers of a normally gaseous olefin, solid catalyst particles, and an inert liquid reaction medium with a catalyst deactivating material such as water or an alcohol, thereafter contacting with agitation for a relatively short time the reaction mixture containing deactivated catalyst particles with an aqueous solution of sodium bicarbonate or potassium bicarbonate, and separating the aqueous solution, there is obtained a white polymer product having a substantially reduced content of inorganic components.

Although the process of the invention is applicable to alpha-olefins generally, as hereinafter defined, for convenience the present process is described largely in terms of polymerizing propylene to form solid polypropylene.

In carrying out the process of the invention, propylene is contacted with a dispersion of a solid catalytic material maintained in an inert liquid reaction medium. After the polymerization reaction, a catalyst deactivating material is added to the reaction mixture. Water or an alcohol such as methanol, ethanol, propanol, isopropanol, the butyl alcohols and the like can be used. In some instances, as hereinafter described, it is advantageous to combine the catalyst deactivating step with the catalyst removal step, e.g., by using an aqueous solution of potassium bicarbonate to both deactivate and remove the catalyst. After the catalyst deactivation, the excess catalyst deactivating liquid is removed such as by draining and an aqueous solution of sodium or potassium bicarbonate added. It is only necessary to contact such aqueous solution with the polymer for a relatively short period of time, 0.5 hour generally being sufficient. The polymer is then washed with water and dried.

The polypropylene product obtained as above described has a melting point of from 160° to 170° C., a tensile strength of from 4,000 to 6,000 p.s.i. (pounds per square inch), and a molecular weight of from 100,000 to 250,000. The polymer may be substantially crystalline or substantially amorphous in nature. Usually, a mixture of crystalline and amorphous polymer is obtained. If desired, amorphous polymer can be separated from the crystalline polymer by contacting a mixture thereof with a hydrocarbon solvent such as isooctane or n-heptane at an elevated temperature. The amorphous polymer is substantially soluble under these conditions whereas the crystalline polymer is substantially insoluble. The polymer prepared according to the present invention can be either crystalline or mixtures of crystalline with amorphous polymer in which the mixture contains at least 25% by weight, and prefarably at least 50% by weight, of the crystalline polymer. A polymer which consists essentially of crystalline polypropylene is an especially desirable product because of its superior properties.

In performing the polymerization step of the present process, a catalyst which is preferably a halide of titanium is used as above described, but other halides and salts of the metals of groups IV, V and VI of the periodic table can be employed. Preferably a halide or salt of titanium, zirconium, hafnium, vanadium, niobium, chromium, molybdenum or tungsten is used. The metal of the metal compound must be in a valence other than its highest valence state. The reduction of a metal compound such as titanium tetrachloride can be accomplished by any convenient means. As above described, an aluminum trialkyl can be used as the reducing agent, or other reducing means such as by contacting the metal compound with a dispersion of an alkali metal in an inert solvent can be used. It is necessary, however, that an activator such as an aluminum trialkyl be present as a component of the catalyst, and it is convenient in many instances to employ such a compound as both the reducing agent and the activator. However, the use of a prereduced compound, such as $TiCl_3$ or $TiCl_2$, together with an activator, gives excellent results. Materials which can be used as the activator, in addition to aluminum trialkyls, include other metal alkyls, metal hydrides, metal borohydrides and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium, phenylisopropyl-potassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used are Grignard reagents such as methylmagnesium bromide, ethylmagnesium chloride, phenylmagnesium bromide, and the like.

The quantities of catalytic components can be varied and good results obtained. A mole ratio of metal compound to activator of from 1:10 to 10:1 gives good results when the metal compound is prereduced or is reduced by the activator. The total quantities used are preferably such that a light slurry of the solid phase in the inert, liquid reaction medium which can be easily agitated is obtained. Generally from 1 part of catalyst particles to from 30 to 1,000 or more parts of the reaction medium gives good results.

As above described, the catalyst is a finely divided solid maintained as a slurry, or a dispersion, in an inert liquid reaction medium. Saturated hydrocarbons such as the hexanes, heptanes, octanes, decanes, cyclopentanes, cyclohexanes, mixtures thereof and the like which are liquid under the conditions of reaction are preferred materials to use as the reaction medium. Propylene is introduced into the catalyst slurry such as by bubbling propylene in gas phase into the slurry. If desired, the propylene can be dissolved in a hydrocarbon which is preferably the same as the reaction medium, and the resulting solution contacted with the catalyst slurry. The polymerization is performed under polymerizing conditions including a temperature within the range of from about 0° C. to 250° C. and a pressure of from atmospheric to about 5,000 p.s.i.g. (pounds per square inch gauge) or more, it being necessary that the reaction medium be maintained in the liquid phase.

After the polymerization step, the catalyst deactivating material is added to the reaction mixture. If a relatively large quantity of inert reaction medium was used in the polymerizing step, it is advantageously separated from the polymer product such as by draining prior to introducing the catalyst deactivant. Water or a relatively low molecular weight alcohol such as methanol, ethanol, propanol, or isopropanol is a preferred catalyst deactivant. Contacting the polymer with the catalyst deactivant is preferably performed with agitation means which chop or comminute the polymer so that catalyst particles coated by or embedded in the polymer are exposed to the action of the deactivant. The liquid deactivant is then preferably removed from the polymer such as by draining or filtering, and the separated polymer contacted with an aqueous solution of sodium bicarbonate or potassium bicarbonate. Preferably a solution which is substantially saturated at the temperature of washing is used, but concentrations as low as 10% by weight give good results within the defined temperature range. The total quantity of the solution used to contact the polymer can be varied substantially. A quantity sufficient to insure good mixing should be used. Generally from about 10 to 300 parts of solution per part of polymer is used. Only a relatively short contacting time is required, say from about 0.1 to 1 hour, but longer times can be used without deleterious results. Mild agitation means are preferably employed during this contacting.

In an embodiment of the invention, an aqueous solution of sodium bicarbonate or potassium bicarbonate is used as both the catalyst deactivant and to remove the catalyst or catalyst residues from the polymer. In this embodiment, the aqueous bicarbonate solution is added directly to the reaction mixture, preferably after the removal of excess inert liquid diluent, if any, from the polymer. In this embodiment, the admixing of the bicarbonate solution with the polymer should be by means which chop or comminute the polymer, thereby exposing catalyst particles embedded therein or coated thereby. Preferably the contacting is performed at an elevated temperature which is advantageously at about the boiling point of the bicarbonate solution, since use of an elevated temperature appears to accelerate the removal of inorganic contaminants from the polymer.

In another embodiment of the invention, the sodium or potassium bicarbonate can be dissolved in a mixture of water and a low molecular weight alcohol, such as methanol, ethanol, propanol or isopropanol. Such a mixture advantageously contains 0.5% to 30% by weight alcohol. It appears that the presence of alcohol increases the rate of catalyst removal by the bicarbonate deactivant. If desired, the polymer can be wet with the alcohol prior to adding the aqueous solution of the bicarbonate.

The following examples illustrate the embodiments of the present invention in which "parts" refers to parts by weight unless otherwise indicated.

*Example 1*

Solid polypropylene was prepared by incorporating 0.83 part of titanium trichloride and a quantity of aluminum triethyl sufficient to give a mole ratio of titanium trichloride to aluminum triethyl of substantially 0.8 in about 205 parts of n-heptane. The temperature of the resulting slurry was adjusted to 80° C. and propylene added to give a total pressure in the reactor of 63 p.s.i.g. After several hours, during which time the pressure was maintained at substantially 63 p.s.i.g. by periodic addition of propylene to the reactor, both the temperature and pressure were increased. The temperature was maintained within the range of from about 100° C. to 108° C. and the pressure at about 135 p.s.i.g. for several hours, during which time additional propylene was added to maintain the pressure substantially constant. The reaction as then stopped and the product still containing active catalyst was divided into several portions which were treated as described below.

100 parts of water containing sufficient potassium bicarbonate to form a saturated solution at 90° C. was contacted with 2 parts of the polymer for 1 hour with mechanical agitation. The product was thereafter drained, washed with water and dried. The product was a white solid containing .08% by weight of titanium materials (calculated as titanium).

The foregoing procedure was repeated using 100 parts of water saturated with sodium bicarbonate at room temperature (about 21° C.). The time of contacting was ½ hour, during which time ambient temperature (about 21° C.) was used. Again the product was a white solid polymer product of low titanium content.

The foregoing procedure was repeated using 100 parts of a 25% by weight potassium carbonate solution. The polymer was contacted with the solution at its boiling temperature for 1 hour. The recovered product was grey rather than white as obtained above.

*Example 2*

Another polypropylene polymer product was prepared by incorporating 4.95 parts of titanium trichloride and a quantity of aluminum triethyl sufficient to give a mole ratio thereof to titanium trichloride of substantially 1 in 2736 parts of n-heptane. The temperature of the resulting slurry was adjusted to 85° C. and propylene was thereupon introduced to give a pressure of 200 p.s.i.g. The reaction was continued for 100 minutes during which time the pressure was maintained at substantially 200 p.s.i.g. by periodic addition of propylene. Isopropanol was then added to the reaction mixture to deactivate the catalyst. The solid polypropylene product was separated and divided into several portions which were treated as described below.

20 parts of the polypropylene containing deactivated catalyst were contacted, at ambient temperature, with 300 parts of water saturated with sodium bicarbonate at room temperature for ¼ hour. The product was then drained, washed with water, and dried. The resulting polymer was molded at 10,000 p.s.i.g. and 232° C. The resulting molded product was white and clear.

To 20 parts of the polypropylene product, prepared as above described, were added about 200 parts of a 10% solution of nitric acid in isopropanol. The mixture was heated to reflux temperature for 1½ hours. The product was then washed with water and dried. The resulting product was molded, as above described, at 232° C. at 5000 p.s.i.g. The product had a distinct yellow color, even through the molding conditions were relatively mild.

In the foregoing examples which were performed in accordance with the process of the invention, no difficulties were experienced with corrosion.

The products of the invention are especially useful in applications were appearance is important, such as in films for wrapping purposes, especially for wrapping food products, as containers for liquids, and the like. Such articles can be prepared by molding, extrusion, or other fabrication processes.

The invention claimed is:

1. Process for the preparation of a substantially metal-free solid alpha-olefin polymer from a solid alpha-olefin polymer containing catalyst residues remaining therein after polymerizing an alpha-olefin in the presence of a titanium halide catalyst and an activator therefor selected from the group consisting of metal alkyls, metal hydrides, metal borohydrides, and alkyl metal halides, which comprises contacting said alpha-olefin polymer containing said catalyst residues with an aqueous solution of a material selected from the group consisting of sodium bicarbonate and potassium bicarbonate, and separating a substantially metal-free solid alpha-olefin polymer from said aqueous solution.

2. Process for the preparation of substantially metal-free solid polypropylene from polypropylene containing catalyst residues remaining after polymerizing propylene in the presence of a titanium halide catalyst and an activator therefor selected from the group consisting of metal alkyls, metal hydrides, metal borohydrides, and alkyl metal halides, which comprises contacting said polypropylene containing said catalyst residues with from 10 to 300 parts by weight of an aqueous solution of a material selected from the group consisting of sodium bicarbonate and potassium bicarbonate, and separating substantially metal-free solid polypropylene from said aqueous solution.

3. Process according to claim 2 wherein said selected bicarbonate is sodium bicarbonate.

4. Process according to claim 2 wherein said selected bicarbonate is potassium bicarbonate.

References Cited in the file of this patent

UNITED STATES PATENTS

| | | |
|---|---|---|
| 2,838,477 | Roelen et al. | June 10, 1958 |

FOREIGN PATENTS

| | | |
|---|---|---|
| 538,782 | Belgium | Dec. 6, 1955 |
| R13,922 | Germany | Feb. 9, 1956 |